Dec. 26, 1950   C. O. FORBES   2,535,673
CURVE-CUTTING BAND-SAW ATTACHMENT
Filed June 6, 1946   3 Sheets-Sheet 1
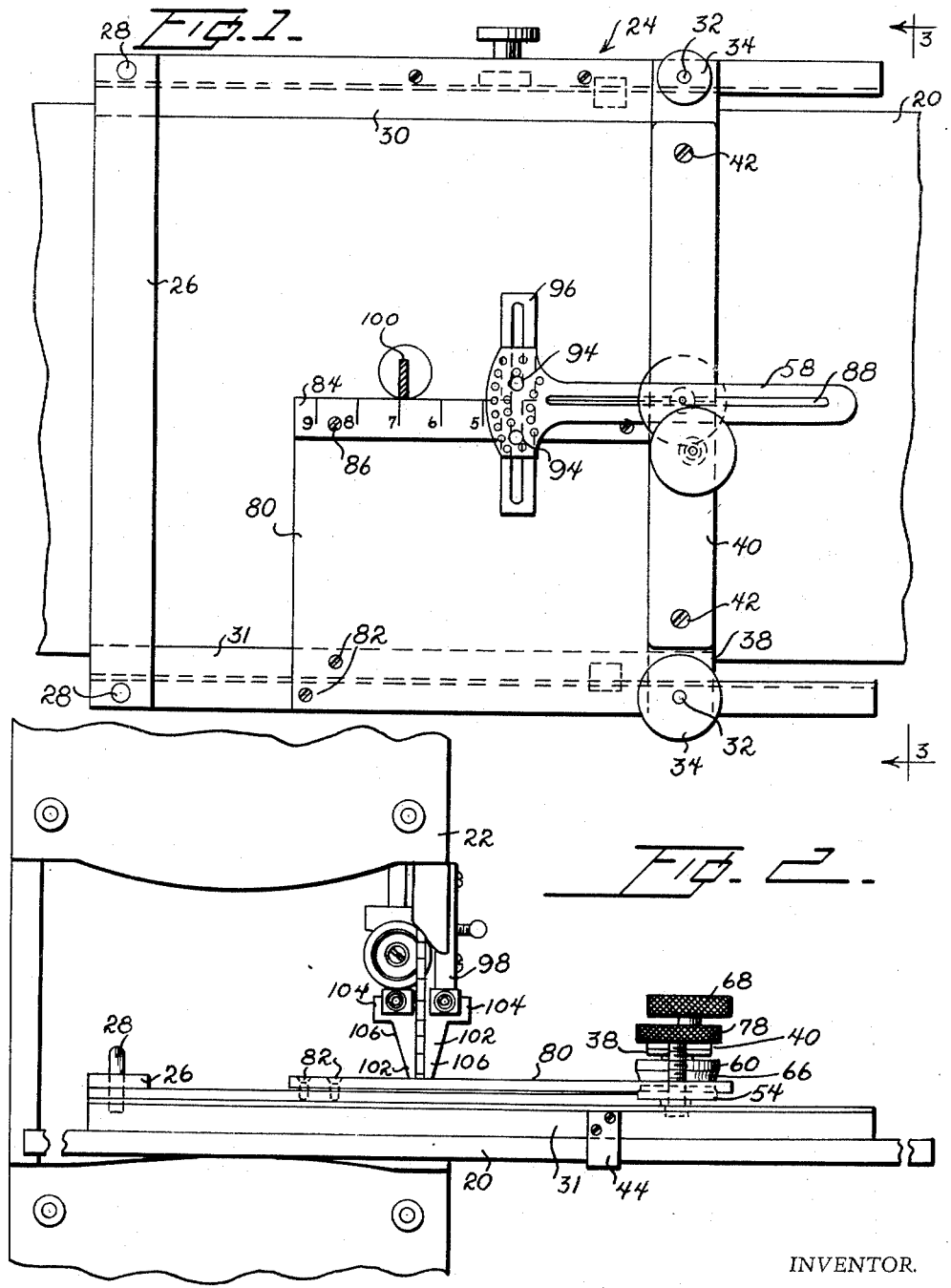
INVENTOR.
Charles O. Forbes
BY Victor J. Evans & Co.
ATTORNEYS Dec. 26, 1950 C. O. FORBES 2,535,673
CURVE-CUTTING BAND-SAW ATTACHMENT
Filed June 6, 1946 3 Sheets-Sheet 2
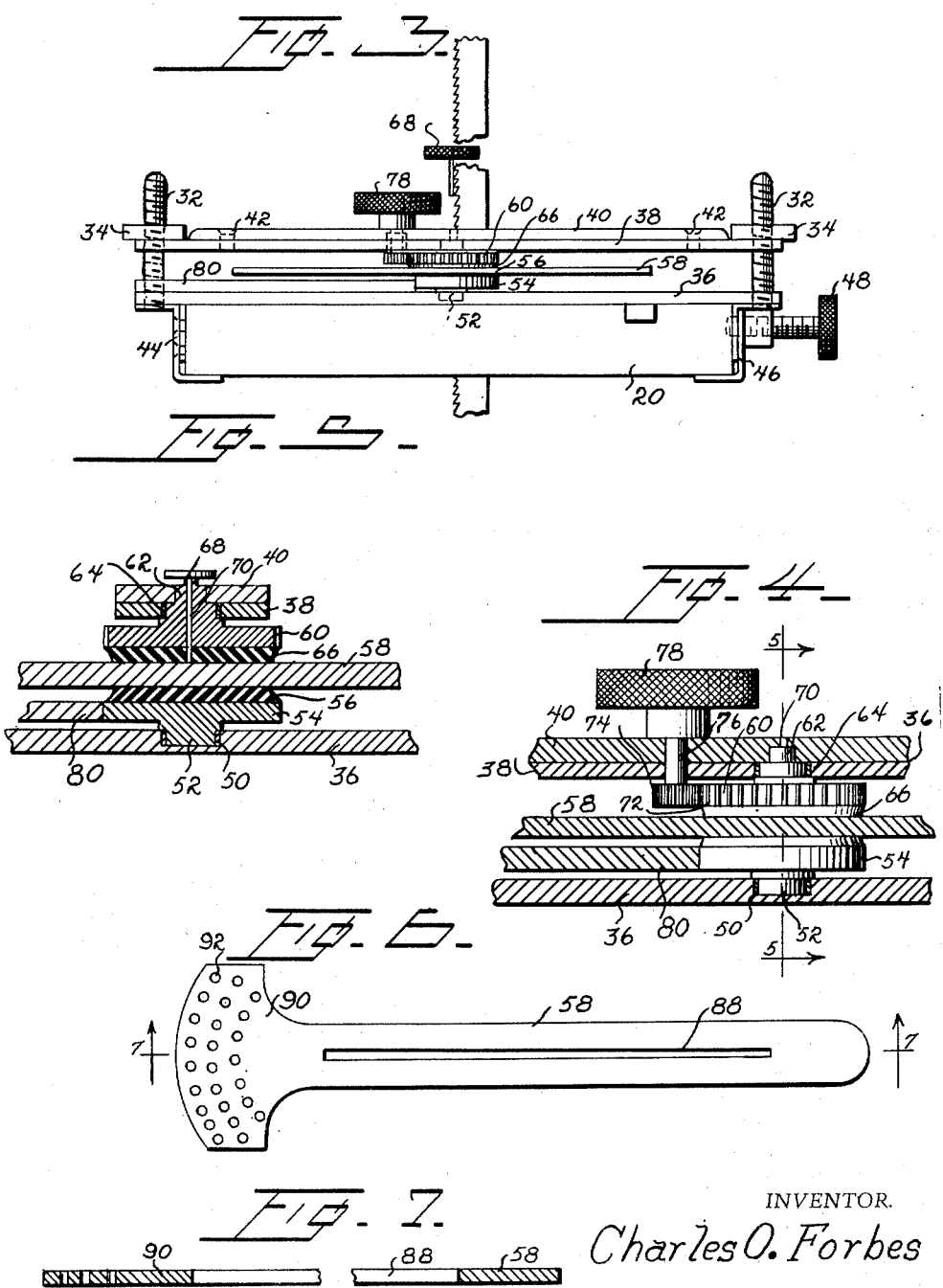
INVENTOR.
Charles O. Forbes
BY Victor J. Evans & Co.
ATTORNEYS Dec. 26, 1950     C. O. FORBES     2,535,673
CURVE-CUTTING BAND-SAW ATTACHMENT
Filed June 6, 1946     3 Sheets—Sheet 3
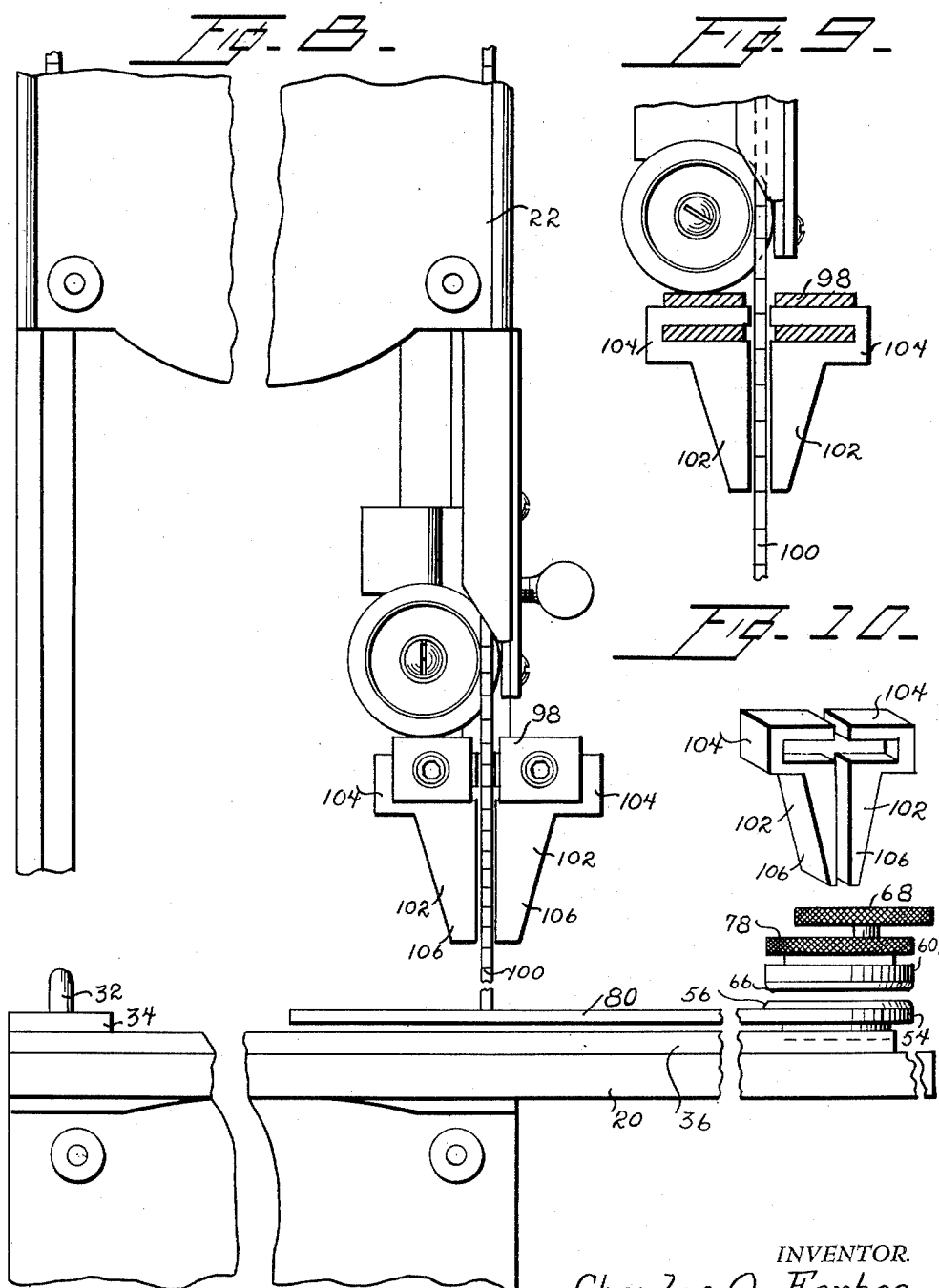
INVENTOR.
Charles O. Forbes
BY Victor J. Evans & Co.
ATTORNEYS Patented Dec. 26, 1950

2,535,673

UNITED STATES PATENT OFFICE 2,535,673

CURVE-CUTTING BAND-SAW ATTACHMENT

Charles O. Forbes, Bremerton, Wash.

Application June 6, 1946, Serial No. 674,731

3 Claims. (Cl. 143—171)

This invention relates to a band or jig-saw attachment, and more particularly to a device to be used for facilitating the cutting of discs and radius cutting.

An object of the invention is to provide an attachment that is adjustable, so that large radii on small pieces of work may be cut efficiently and easily, with the maximum amount of accuracy.

Another object of the invention is to provide a device which may be removably secured to an existing saw table without modifying or changing the structure thereof, so as to interfere with the using of the machine for other kinds of work.

With the above and other objects and advantages in view, the invention consists of the novel details of construction, arrangement and combination of parts more fully hereinafter described, claimed and illustrated in the accompanying drawings in which:

Figure 1 is a top plan view of an embodiment of the invention;

Figure 2 is a front view thereof as applied to a band saw;

Figure 3 is a view looking in the direction of the arrows on the line 3—3 of Figure 1;

Figure 4 is an enlarged detailed vertical sectional view of a portion of Figure 3;

Figure 5 is a sectional view on the line 5—5 of Figure 4;

Figure 6 is a plan view of the radii cutting attachment of the device;

Figure 7 is a sectional view on the line 7—7 of Figure 6;

Figure 8 is the same as Figure 2, with the saw guide raised from contact with the saw bed;

Figure 9 is a vertical sectional view of part of Figure 8; and

Figure 10 is a perspective view of the saw guide.

Referring more in detail to the drawings, the reference numeral 20 designates the saw table of the band saw 22 on which the attachment 24 is mounted.

The attachment comprises the portable tie bar 26 having upstanding dowel pins 28 at each end thereof for attachment thereto of the parallel disposed angle arms 30 and 31 respectively, which extend at right angles to the bar 26, and are provided at their ends with stud bolts 32, having knurled nuts 34 for engagement with the bar 36 which is in parallel relation with bar 26. Mounted above the bar 36 on the stud bolts 32 is the strong back which comprises the bar 38 in parallel relation with bar 36, and the reinforcing plate 40 secured thereto on the upper surface thereof by fasteners 42, and plate 36 is provided with brackets 44 and 46 respectively for mounting the attachment on the saw bed, and a set screw 48 in bracket 46 when tightened will firmly retain the attachment in relation to the bed. See Fig. 3.

Mounted in bar 36 by means of a thrust bearing 50 (Figures 4 and 5) is the stub axle 52 of the clamping disc 54 which is faced with soft rubber 56 to engage the undersurface of the arm 58 and a similar disc 60 is mounted by means of its stub axle 62 in the thrust bearing 64 in plates 38 and 40 in opposed relation to the disc 54, and the soft rubber face 66 thereof engages the upper surface of the arm 58 and a centering pin 68 is mounted in the central bore 70 thereof for the mounting of the arm 58 when large radii are to be cut in small pieces of material. Otherwise the work is clamped between the discs 54 and 60 and cut without the necessity of having an axial hole in the work.

The periphery of the disc 60 is provided with teeth 72 to engage the gear 74 on the shaft 76 which is mounted in plates 38 and 40, and the upper end of the shaft is provided with a knurled knob 78. A filler plate 80 is mounted on the frame by means of fasteners 82, Figure 2, and terminates adjacent the disc 54, and this plate has a radius gage 84, Figure 1, secured thereto by fasteners 86.

The arm 58 which is mounted on the pin 68 intermediate the discs 54 and 60 is adjustable on the pin by means of the elongated slot 88 (Figures 1, 6 and 7) and the arm has a substantially sector shaped head 90 provided with relatively spaced apertures 92 for receiving wing clamping screws 94 for clamping odd shaped pieces of work thereon by means of the clamp plate 96.

Mounted on the band saw foot 98 on opposite sides of the band saw 100 are the saw guides 102 provided with the U-shaped portions 104 for the mounting thereof, and the depending opposed guide portions 106 which lie on opposite sides of the saw 100 to permit the guide to be placed closer to the work to guide the saw in its cutting of the radii.

In operation of the device, the attachment is placed on the saw table and the gauge 84 is set with relation to the blade 100 at the desired radius, then the set screw 48 is tightened to secure the attachment in fixed relation to the saw table. The work is clamped between the discs 54 and 60 in engagement with the rubber faces 56 and 66, and upon rotation of the knob 78, the work can be turned for engagement with the saw for the cutting thereof. By this method of manipulation, the work can be cut into various size circles without an axial hole in the center of the work. Where large radii are to be cut in small pieces of material, the work may also be clamped to the arm 58 and engaged with the saw to cut the desired radii by swinging the arm in a circle, and the guides are used to prevent the saw from bending and not cutting a true radius.

This attachment has been designed for light work only, but it may be modified in various ways to operate with heavy work.

It is believed that the operation and construction of the attachment will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. An attachment of the character described, comprising a frame adapted to be mounted on the saw table of a band saw, means for fastening said frame to the saw table, said frame comprising a portable tie bar normally lying across the saw table, a pair of parallel disposed angle arms each contacting the edge of the saw table and each arm being secured at one end to one of the opposite ends of the tie bar, stud bolts on the opposite ends of said arms, a first bar mounted on said stud bolts in parallel relation to said tie bar, a second bar mounted on said bolts above said first bar and said first bar carrying the means for fastening said frame to said saw table, an arm pivotally supported on said first bar and means for adjusting said arm to position a piece of work secured thereto with relation to the band saw.

2. The invention as in claim 1 wherein a filler plate is secured to the frame and a radius guage is mounted on said plate and said plate is positioned below said arm and provides a work table for the work secured to said arm.

3. The invention as in claim 1 wherein opposed clamping means is provided for pivotally and adjustably mounting said arm on the second bar of said frame.

CHARLES O. FORBES.

REFERENCES CITED

The following references are of record in the file of this patent:

UNITED STATES PATENTS

| Number | Name | Date |
|---|---|---|
| 149,654 | Hanna | Apr. 14, 1874 |
| 403,618 | Springstead | May 21, 1889 |
| 545,131 | Ohler | Aug. 27, 1895 |
| 754,343 | Piper | Mar. 8, 1904 |
| 1,639,039 | Knabusch et al. | Aug. 16, 1927 |
| 1,944,524 | Parrish | Jan. 23, 1934 |
| 2,394,789 | Lavoie | Feb. 12, 1946 |

FOREIGN PATENTS

| Number | Country | Date |
|---|---|---|
| 195,791 | Germany | Feb. 25, 1908 |
| 479,527 | Germany | July 18, 1929 |